INVENTORS:
RUDOLPH I. SCHONITZER
EDWIN L. ALLEN
HAROLD B. MUSTER
BY Hyde and Meyer
ATTORNEYS.

Sept. 28, 1943. R. I. SCHONITZER ET AL 2,330,794
CONNECTING AND GUIDING MEANS FOR ENDLESS TRACKS AND THE LIKE
Filed Feb. 14, 1942 3 Sheets-Sheet 2
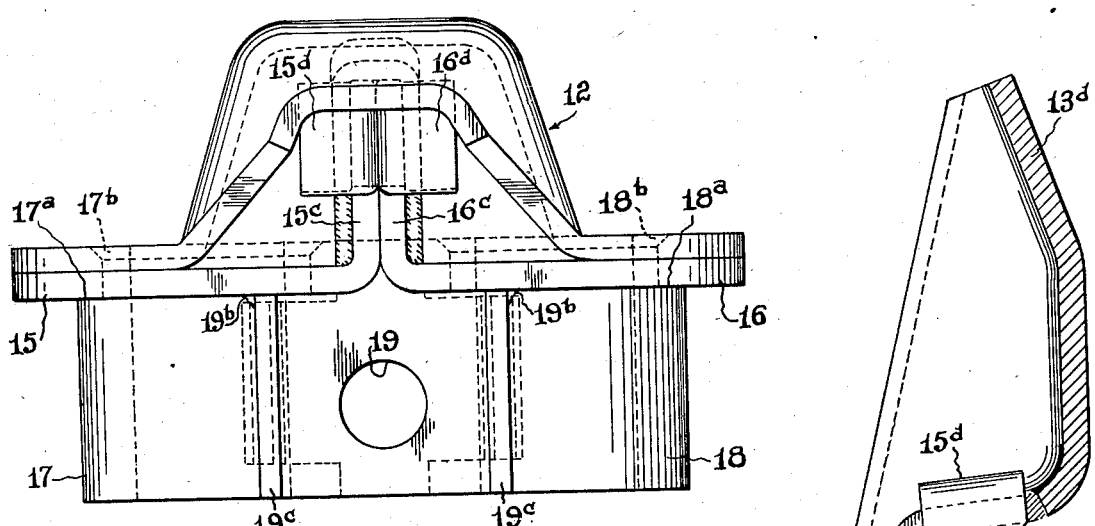
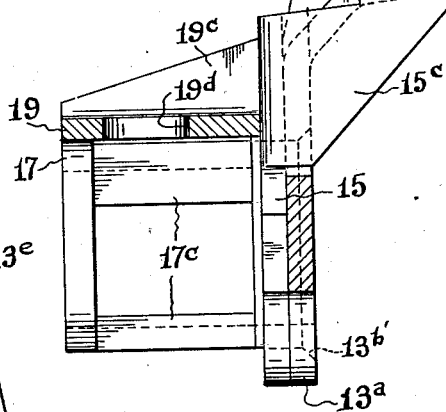
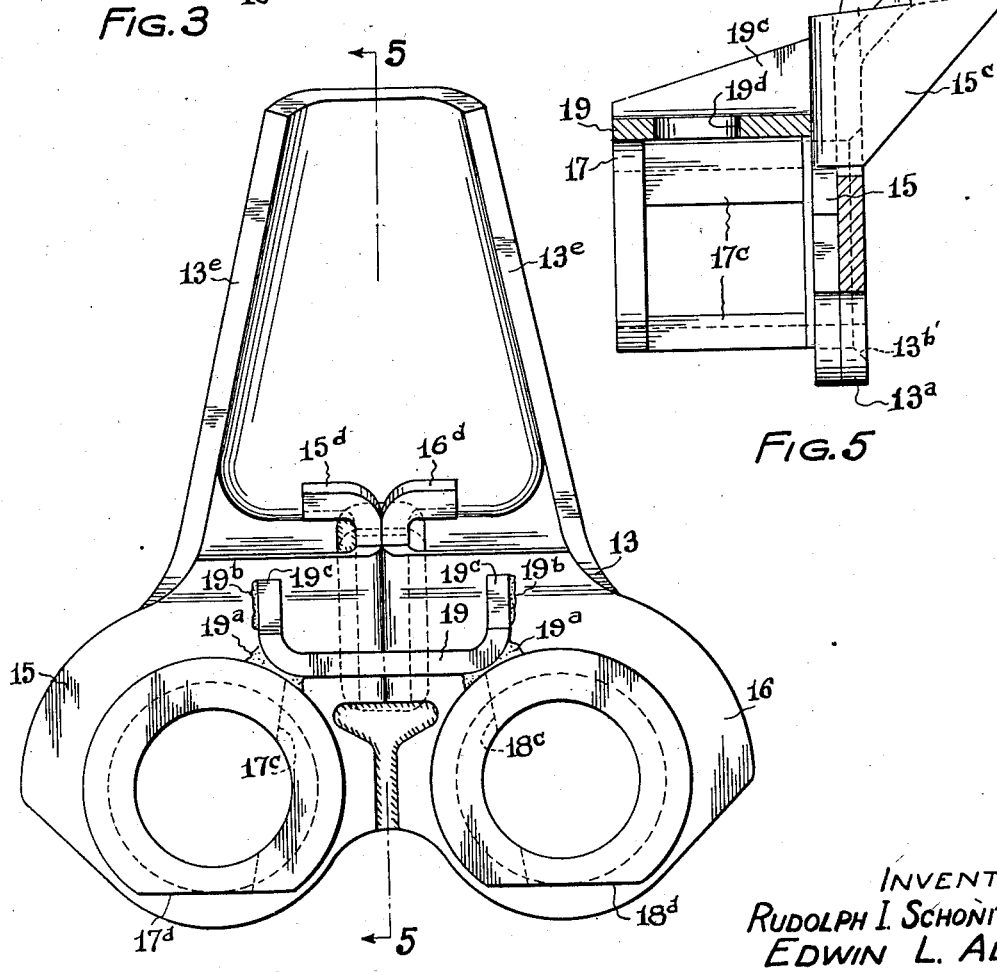
INVENTORS:
RUDOLPH I. SCHONITZER
EDWIN L. ALLEN
HAROLD B. MUSTER
BY Hyde and Meyer
ATTORNEYS.

Sept. 28, 1943.  R. I. SCHONITZER ET AL  2,330,794
CONNECTING AND GUIDING MEANS FOR ENDLESS TRACKS AND THE LIKE
Filed Feb. 14, 1942  3 Sheets-Sheet 3
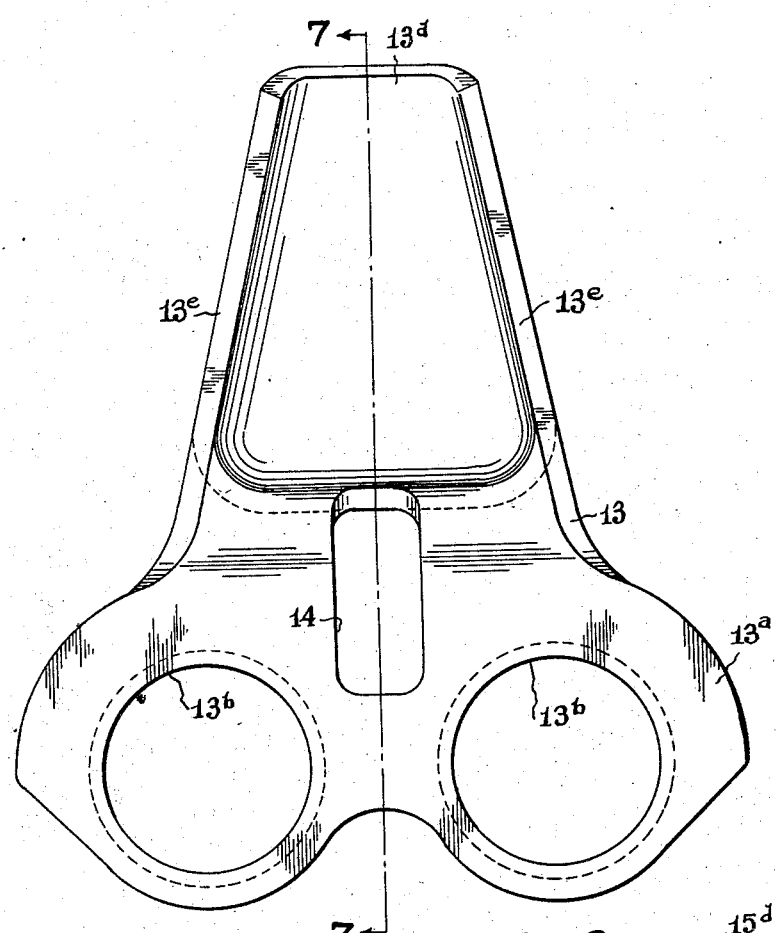
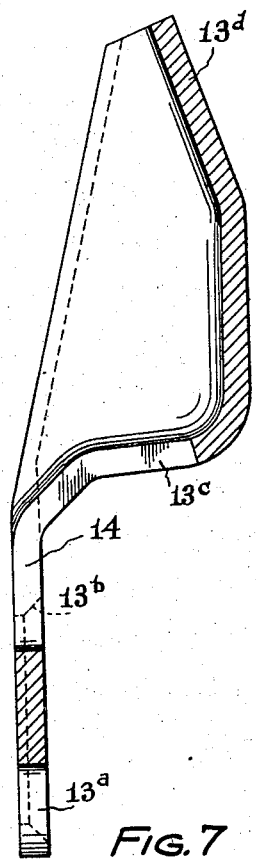
Fig. 6
Fig. 7
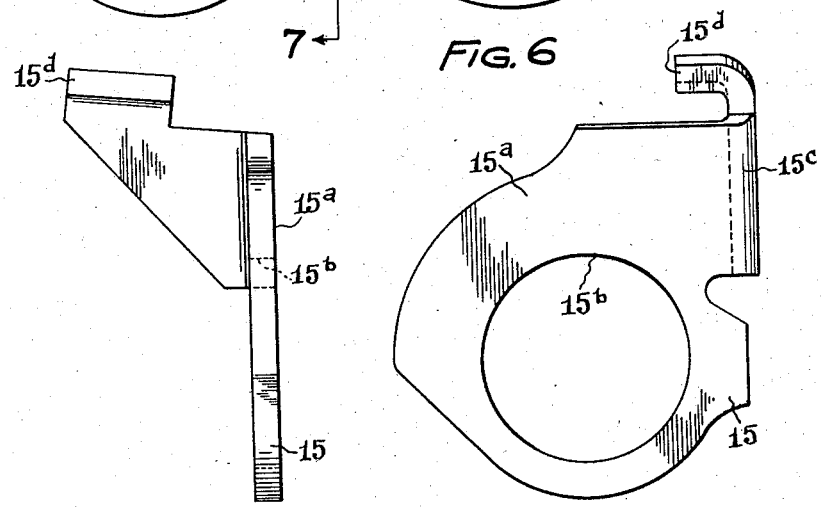
Fig. 8
Fig. 9
INVENTORS:
RUDOLPH I. SCHONITZER
EDWIN L. ALLEN
HAROLD B. MUSTER
BY Hyde and Meyer
ATTORNEYS.

Patented Sept. 28, 1943

2,330,794

UNITED STATES PATENT OFFICE 2,330,794

CONNECTING AND GUIDING MEANS FOR ENDLESS TRACKS AND THE LIKE

Rudolph I. Schonitzer, Shaker Heights, and Edwin L. Allen and Harold B. Muster, Cleveland Heights, Ohio; said Allen and said Muster assignors to said Schonitzer Application February 14, 1942, Serial No. 430,986

10 Claims. (Cl. 305—10)

This invention relates to an improvement in the construction of endless tracks having separate tread blocks, and relates to a combined end connector for adjacent tread blocks and a track guide for retaining the track on bogie wheels and sprockets.

Track guides and end connectors are in use comprised of forgings but these have many disadvantages which are overcome by our improved devices. In the present improvement the parts are formed of metal stampings welded together where necessary and it results from our improvements that great uniformity is possible, little or no machining is necessary after assembly, and harder wearing surfaces are provided by the proper selection of the metal for the stampings and the heat treatment to which they are submitted. It follows from this that our improved devices are less costly to produce, are suitable for mass production, and give more satisfactory results in use.

One of the objects of the present invention therefore is to provide a device of this sort which can be formed of sheet metal stampings connected together by welding and provided with reinforcing flanges, ribs and projections and reinforcing plates where necessary or desirable so as to obtain all of the advantages pointed out in the preceding paragraph. The nature of our invention will be more clearly understood from the accompanying drawings and description and the essential features thereof will be set forth in the claims.

In the drawings, Fig. 1 is a plan view of a portion of an endless track equipped with our improved track guide and connector;

Fig. 3 is an enlarged top plan view of the combined track guide and end connector shown in Figs. 1 and 2;

Fig. 4 is a front elevational view of the device of Fig. 3;

Fig. 5 is a sectional view of the same taken along the line 5—5 of Fig. 4;

Fig. 6 is a front elevational view of the main stamping forming a part of the device of Figs. 3, 4 and 5;

Fig. 7 is a sectional view taken along the line 7—7 of Fig. 6; while

Figs. 8 and 9 are end and front elevational views of one of the smaller stampings of the device shown in Figs. 3 to 5.

It will be understood by those skilled in this art that our device is applicable to that type of endless track used for tanks, tractors, trucks and the like and which is composed of a plurality of separate tread blocks 10 which are united in link fashion to form the endless track. Such tread blocks are quite often formed of rubber in which are embedded crossbars 11, two to each block, the exposed ends of which serve as link pins for the end connectors. The blocks 10 are cut away as shown at 10a to permit them to pass around sprockets and guide wheels.

Figure 1:
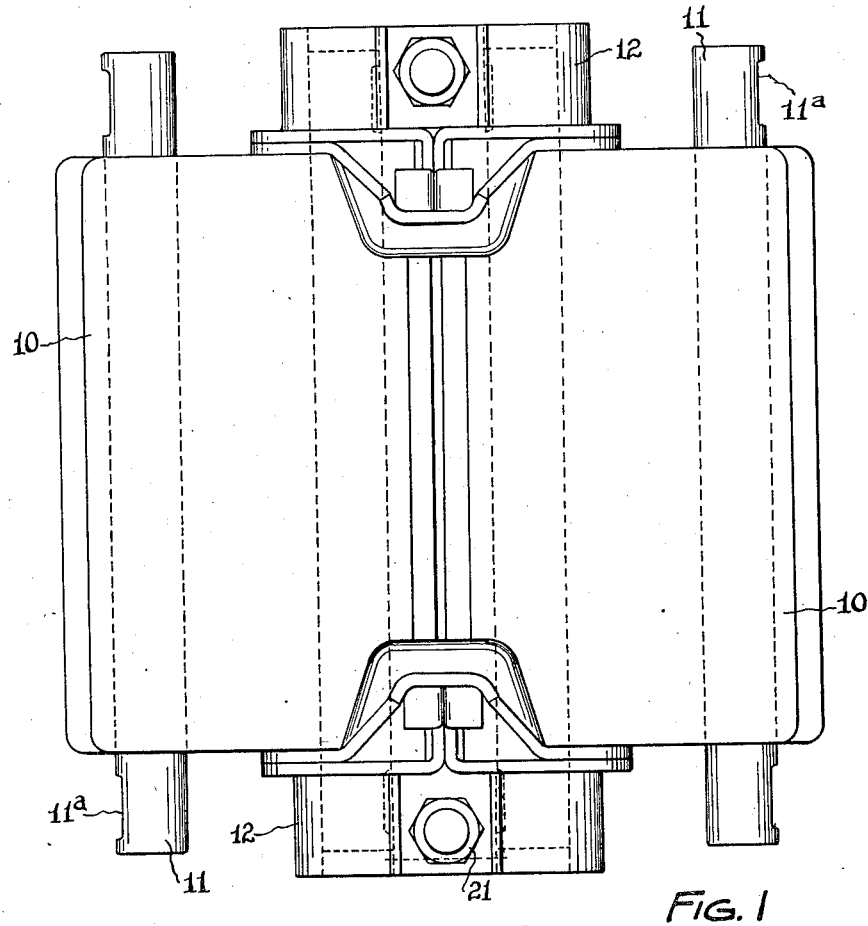
Figure 2:
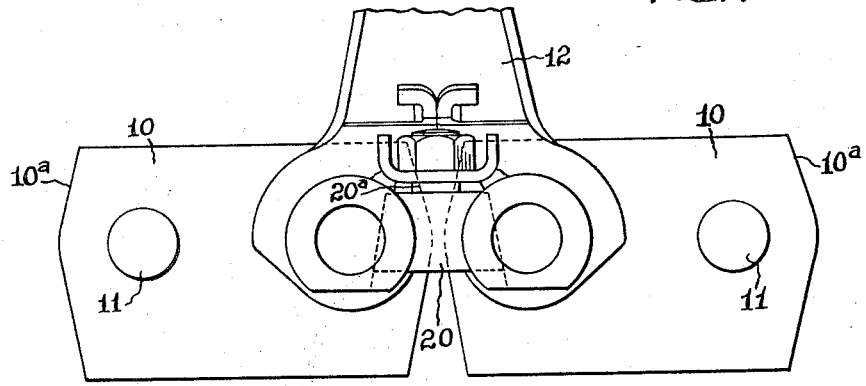
Fig. 2 is an end elevational view of the track of Fig. 1.

The present invention has to do with the combined end connector and track guide indicated at 12 in Figs. 1 and 2. This device has three functions, namely, it provides a connecting link between the crossbars of adjacent blocks so as to tie the blocks together into an endless track; it also is formed with an upstanding projection which prevents the track from slipping off the bogie wheels and sprockets; and thirdly, it provides a bearing surface for the sprockets which drive the track.

This device 12 is here shown as comprising four sheet metal stampings and two tubular members. The main stamping 13 as best seen in Figs. 6 and 7 comprises a link portion 13a lying generally in a plane parallel to the longitudinal dimension of the track and provided with two openings 13b through which the crossbars 11 of adjacent tread blocks are adapted to pass as will later appear. These openings are countersunk at 13b' to aid in the attachment of the tubular members to be later described. The main stamping is offset as at 13c inwardly toward the center of the track and substantially at right angles to the plane of the link portion. The offset portion is then turned upwardly in a direction opposite to the link portion forming the guide portion 13d. The free end of this guide portion is flared back toward the plane of the link portion as best seen in Figs. 5 and 7 so as to provide a smooth engagement with the bogie wheels, sprockets and other guiding surfaces. The guide portion is strengthened by means of the side edge flanges 13e which extend from the free end of the guide portion down to the offset portion in the plane of the link portion. This provides a cheap but strong construction preventing bending of the guide portion when subjected to heavy stresses during its normal use. The general appearance of the offset and guide portions is therefore that of a cupping of the sheet metal in the upper part of the device as viewed in Figs. 4, 5, 6 and 7. The main stamping has a central hole 14 cut away to receive the strengthening ribs later described.

Reinforcing means is provided for the link portion 13a and in the present instance this takes the form of two stampings 15 and 16, one of which is shown separately in Figs. 8 and 9 for clearer understanding. A portion 15a is flat and lies parallel to the link portion 13a and is welded to it. An opening 15b serves to receive the tubular members later described. A rib 15c is adapted to enter the opening 14 in the main stamping and is provided at its outer end with a tongue 15d which is welded to the offset portion 13c of the main stamping. The rib 15c thus extends across the angle between the portions 13a and 13c of the main stamping and gives a very strong reinforcement at this point. It will be noted from Figs. 3 and 4 that the ribs 15c and 16c lie face to face and are adapted to fit in the space between the flared away surfaces 10a of adjacent tread blocks as best seen in Fig. 2. This space is very narrow and the present construction takes full advantage of that space. This reinforcing rib construction may be formed on either portion 13a or 15a in any suitable manner so long as it adapts itself to the space between adjacent tread blocks. The ribs 15c and 16c may be spot or projection welded together if desired.

Tubular members 17 and 18 are secured to the link portion of our device for the purpose of embracing the crossbars 11 for the attachment of our device thereto. In the form here shown these are heavy tubular members cut away as indicated at 17a, Fig. 3, to provide a shoulder which abuts the portion 15a of the stamping 15. The reduced diameter of the tubular member then passes through the openings 15b and 13b and the inner end of the tubular member is flared out at 17b against the countersunk portion 13b' of the hole in the main stamping. These tubular members are preferably welded in place and provide a firm anchorage on the crossbars 11.

The two tubular members are tied together and reinforced by a channel shape tie piece 19 which is welded to the tubular members at 19a and to the stampings 15 and 16 at 19b. The flanges 19c of this tie piece extend generally parallel to the crossbar 11 and may be of generally triangular form as best seen in Fig. 5 as this gives the necessary strength where needed. A hole 19d through the web of the channel of the tie piece serves to receive a locking bolt.

It will be noted in Figs. 1 and 2 that the ends of crossbars 11 are notched as at 11a to receive a locking piece 20. The tubular members 17 and 18 have milled slots 17c and 18c which register with the notches 11a in the crossbars so as to receive the locking piece. This locking piece has a central stud 20a which extends upwardly through the hole 19d and a nut 21 holds the locking piece in position.

The tubular members are flatted off at the bottom as shown at 17d and 18d to form a base for the grouser which is used to give better traction when the going is heavy.

It will be understood that this type of track is generally driven by a sprocket, the teeth of which engage against the tubular members 17 and 18. These tubular members therefore provide a wearing surface at this point.

What we claim is:

1. In the combination of an endless track composed of tread blocks having link pin crossbars and wherein the track travels over sprocket or bogie wheels, a combined crossbar connector and track guide comprising a sheet metal member having a link portion for connecting crossbars of adjacent tread blocks, said member having a portion bent inwardly toward the track to provide a guide portion, and a reinforcing plate member in the form of a rib lying between adjacent tread blocks and secured across the corner where said bend occurs.

2. In the combination of an endless track composed of tread blocks having link pin crossbars and wherein the track travels over sprocket or bogie wheels, a combined crossbar connector and track guide comprising a sheet metal member having a link portion lying generally in a plane and adapted to connect crossbars of adjacent tread blocks, said member having a track guide portion offset from the plane of said link portion, and a projection connected with said link portion and secured to said offset portion to reinforce said member where said offset occurs.

3. In the combination of an endless track composed of tread blocks having link pin crossbars and wherein the track travels over sprocket or bogie wheels, a combined crossbar connector and track guide comprising a sheet metal member having a link portion lying generally in a plane and adapted to connect crossbars of adjacent tread blocks, said member having a track guide portion offset from the plane of said link portion, a plate member generally parallel to said link portion and secured thereto, and a projection on said plate member secured to said track guide portion.

4. In the combination of an endless track composed of tread blocks having link pin crossbars and wherein the track travels over sprocket or bogie wheels, a combined crossbar connector and track guide comprising a sheet metal member having a link portion lying generally in a plane and adapted to connect crossbars of adjacent tread blocks, said members having a track guide portion offset from the plane of said link portion, second and third sheet metal members generally parallel to and secured to said link portion, said second and third members engaging spaced crossbars, and two contiguous flanges one respectively on each of said second and third members and extending at right angles to said plane and secured to said track guide portion.

5. The combination of claim 4 wherein said offset track guide portion is recessed to receive said flanges, and said flanges form a rib reinforcing said first named member where said offset occurs, said rib lying between adjacent tread blocks.

6. In the combination of an endless track composed of tread blocks having link pin crossbars and wherein the track travels over sprocket or bogie wheels, a combined crossbar connector and track guide comprising a sheet metal member having a link portion lying generally in a plane and adapted to connect crossbars of adjacent tread blocks, said member having a track guide portion offset from the plane of said link portion, tubular members rigidly secured to and extending from said link portion in a direction opposite to said offset portion, said tubular members being adapted to embrace said crossbars, and a tie piece rigidly secured to said tubular members and to said link portion to brace them.

7. In the combination of an endless track composed of tread blocks having link pin crossbars and wherein the track travels over sprocket or bogie wheels, a combined crossbar connector and track guide comprising a sheet metal member having a link portion lying generally in a plane and adapted to connect crossbars of adjacent tread blocks, said member having a track guide portion offset from the plane of said link portion, tubular members rigidly secured to and extending from said link portion in a direction opposite to said offset portion, said tubular members being adapted to embrace said crossbars, there being locking recesses in said tubular members, there being locking recesses in said crossbars registering with said last named recesses, and means in said recesses for locking said tubular members to said crossbars.

8. In the combination of an endless track composed of tread blocks having link pin crossbars and wherein the track travels over sprocket or bogie wheels, a combined crossbar connector and track guide comprising a metal plate member having a link portion lying generally in a plane and adapted to connect crossbars of adjacent tread blocks, said plate member being bent inwardly and then upwardly in a direction opposite to said link portion to provide a guide portion, said guide portion being cupped to provide strengthening flanges at the sides, a second plate member generally parallel to said link portion and welded thereto, a reinforcing member connected with said second plate member and welded to said first plate member where the latter is bent inwardly, and tubular members rigidly secured to said link portion and to said second plate member, said tubular members being adapted to embrace said crossbars.

9. In the combination of an endless track composed of tread blocks having link pin crossbars and wherein the track travels over sprocket or bogie wheels, a combined crossbar connector and track guide comprising a metal plate member having a link portion lying generally in a plane and adapted to connect crossbars of adjacent tread blocks, said plate member being bent inwardly and then upwardly in a direction opposite to said link portion to provide a guide portion, said guide portion being cupped to provide strengthening flanges at the sides, a second plate member generally parallel to said link portion and welded thereto, and a reinforcing member connected with said second plate member and welded to said first plate member where the latter is bent inwardly.

10. In the combination of an endless track composed of tread blocks having link pin crossbars and wherein the track travels over sprocket or bogie wheels, a combined crossbar connector and track guide comprising a link portion lying generally in a plane and adapted to connect crossbars of adjacent tread blocks and a track guide portion offset from the plane of said link portion, means connected with said link portion and extending outwardly therefrom for attachment to said crossbars, and reinforcing ribs extending from the outer ends of said means to said link portion.

RUDOLPH I. SCHONITZER.
EDWIN L. ALLEN.
HAROLD B. MUSTER.